United States Patent [19]
Crane

[11] Patent Number: 4,843,575
[45] Date of Patent: Jun. 27, 1989

[54] INTERACTIVE DYNAMIC REAL-TIME MANAGEMENT SYSTEM

[76] Inventor: Harold E. Crane, 328 Celeste, River Ridge, La. 70123

[21] Appl. No.: 825,648

[22] Filed: Feb. 3, 1986

Related U.S. Application Data

[63] Continuation-in-part of Ser. No. 435,648, Oct. 21, 1982, Pat. No. 4,584,654.

[51] Int. Cl.⁴ .......................... G06F 15/20; G01L 3/26
[52] U.S. Cl. ................................ 364/550; 364/431.01; 364/442; 364/551.01; 73/112
[58] Field of Search ............... 73/112; 364/550, 551, 364/570, 442, 424, 431.01, 431.07

[56] References Cited

U.S. PATENT DOCUMENTS

| | | | |
|---|---|---|---|
| 3,972,224 | 8/1976 | Ingram | 364/442 |
| 4,258,421 | 3/1981 | Juhasz et al. | 364/424 |
| 4,334,425 | 6/1982 | Crane | 73/112 |
| 4,459,671 | 7/1984 | Teass et al. | 364/442 |
| 4,475,380 | 10/1984 | Colovas et al. | 73/112 |
| 4,676,095 | 6/1987 | Eberle et al. | 73/112 |

*Primary Examiner*—Parshotam S. Lall
*Assistant Examiner*—Ellis B. Ramirez
*Attorney, Agent, or Firm*—Foley & Lardner, Schwartz, Jeffery, Schwaab, Mack, Blumenthal & Evans

[57] ABSTRACT

The dynamic real-time management system comprises a micro-processor adapted to sense real-time inputs related to the condition of a powered system. Manual inputs are provided to the word processor and a long-term memory is included. The memory stores historical data related to the real-time inputs and the micro-processor compares sensed real-time parameters with historical data to determine changes in certain unknown operating parameters. The information generated in the micro-processor is transmitted to a central micro-processor contained in a central management facility. In this manner, managers have direct access to information generated at one or more powered systems in order to enable them to make reasonable, logical management decisions to cure costly inefficiencies quickly and reliably.

21 Claims, 11 Drawing Sheets

INTERACTIVE DYNAMIC REAL-TIME MANAGEMENT SYSTEM

CROSS REFERENCE TO RELATED APPLICATIONS

This a continuation-in-part of U.S. application Ser. No. 435,648 filed Oct. 21, 1982, now U.S. Pat. No. 4,584,654.

BACKGROUND OF THE INVENTION

1. Field of the Invention

This invention relates to the operation and the management of powered systems which utilize energy and more particularly to a real-time management system for identifying system inefficiencies and subsystems requiring repair through use of real-time interactive computer analysis and long-term storage of system data.

2. Discussion of Related Art

Powered systems referred to in this application can be either static (i.e., generating plants) or mobile (i.e., ships, locomotives, aircraft of all types, and automotive vehicles such as cars, trucks and buses). Such systems use vast amounts of fuel when operating efficiently. Degradation in system components resulting in only relatively small reductions in efficiency can result in relatively large amounts of excess fuel being consumed if gone undetected over time. In, for example, the shipping industry, ships have routine scheduled maintenance designed to eliminate problems with inefficiently operating subsystems. However, quite often, such maintenance periods do not coincide with optimum times at which maintenance should be performed in order to insure that the cost of inefficient operation will not exceed the cost of performing extra maintenance at a non-scheduled period.

Various methods have been tried to monitor efficiency. Traditional techniques include manual and/or instrumented data gathering of sensed variables at fixed intervals such as every four hours. This data is recorded onto charts and forms and transmitted, usually in printed form, to fleet management. Translation and interpretation of the data is performed by a staff of clerks and engineers. Processing of amended data containing numerous correction factors is performed to place the data in suitable form for analysis. The data is then analyzed using empirical methods and intuitive judgment. The findings are distributed to various departments within the management framework including the operations managers, maintenance manager, the finance department, etc. The findings are interpreted by each department and decisions to remedy a given situation are made if the effects of the situation on operations have survived the point in time in which the data manipulation process has been completed. However, by the time this analysis process has been completed, the cost of the previously undetected inefficiencies is usually quite high and additional inefficiencies may have developed.

Clearly, these traditional techniques for management are no more than historical, after-the-fact attempts at information gathering and do little to solve immediate, real world problems at the time they exist.

There have been efforts to improve on current methodology. These methods largely center around the use of computers to speed up the data gathering process. These improved methods include recording a variety of data from a marine power plant, such as pressures, temperatures, etc. and recording the data on a hard copy printout.

The energy conservation program established by EXXON International is typical of the state of the art. Shipboard data of horsepower, speed, fuel use, etc. are gathered manually and analyzed by a staff of engineers at company headquarters. This process can take months to complete for a single voyage and is used by the company to establish trends rather than bring about conservation on a day-to-day basis.

Another known system which has been developed is a model based decision support system used for voyage estimating, vessel assignment and vessel scheduling. It is typical of the computer based modeling and simulation programs in existence for a number of years.

The National Marine Service has developed what it calls a Vessel Management Information System that is used for cargo booking, vessel contracts and financial performance. It is described as a system consisting of programs and documentation for the physical and financial tracking of a fleet of inland tow boats and tank barges.

The American Commercial Barge Line has developed a system which uses computer based monitoring devices to gather data from several locations on a main engine. The data are passed to a shore side computer which analyzes the data and produces management reports. The objective is to eliminate manual recording of information.

Lykes Brothers Steamship Company experimented in the development of a micro-processor based fleet operational control system. This system was dedicated to ship loading, ship payroll, chart information retrieval and barge rehandling. It was not intended to function in real-time.

Seaworthy Systems, Inc. has attempted to computerize engine tuning techniques known as heat balance as a method to improve engine performance and reduce fuel use. This technique has been in standard use in the marine industry for years, requires operator calculated values, and does not function in real time.

AVICON System manufactures a device which uses fuel flow, shaft speed, horsepower, and shift speed as inputs to produce fuel flows and rates as well as efficiency data. It is primarily intended for installation on small vessels, such as tow boats.

SUMMARY OF THE PRESENT INVENTION

One object of the present invention is to provide a dynamic, interactive, fully automated real-time management system for improving the management and technical operating efficiency of powered systems.

Another object of the present invention is to provide a dynamic, interactive, fully automated real-time management system in which an operator of a powered system is able to interact with the management system in order to aid in the development and the storage of data for future use as well as make decisions to improve the efficiency of the powered system based on real-time information provided by the management system.

A further object of the present invention is to provide a dynamic real-time management system in which data concerning the powered system is stored over a long period to aid in a computer analysis of the efficiency of the powered system by comparing real-time generated data with past recorded data to determine the relative operation of the powered system compared to the operation of the powered system in the past under similar operating conditions.

A still further object of the present invention is to provide a dynamic real-time management system in which data generated at each powered system is transmitted through a communication link to a processor at a central management facility for providing moment-by-moment information on a continuous basis.

An even further object of the present invention is to provide a dynamic real-time management system in which the processor at the central location includes a plurality of intelligent terminals located in operations, finance, maintenance and supply sections of the corporation in order to provide each of these sections with information relevant to their decision-making authorities.

According to the above and other objects, the present invention is an interactive, dynamic, real-time management system comprising a plurality of powered systems and a central management facility. Each of the powered systems includes a processor which receives inputs from real-time sensors relating to real-time variables affecting the operation of the powered system. A monitoring memory is provided for the processor to store data related to the real-time input as well as data related to manual inputs for fixed parameters. An interactive terminal is also provided. The local processor is programmed to determine various efficiency related parameters based on presently measured variables as well as stored historical data relevant to the presently measured variables. The stored historical data is essential in giving an indication of the present relative state of the parameters of interest.

The local processors are also programmed to calculate the cost of presently occurring inefficiencies in order to provide the operator of each powered system with data on which to make a decision concerning the control of the power plant. That is, the operator is provided with information which indicates that a subsystem is operating inefficiently, the cost of the inefficient operation in units of capital expended per lapse of time. In this manner, the operator can make immediate decisions to change certain control parameters at which time he will notice an immediate increase or decrease in efficiency.

At the same time, the efficiency parameters in measured variables are transmitted through the communication link to a central management facility. Either the local processor or the central management facility processor will be programmed with various predetermined schedules for the powered system, such as maintenance schedules, cost of maintenance, etc. The processors are also programmed to compare the cost of currently occurring inefficiencies with the cost of repair to determine whether the maintenance schedule for that particular powered system should be modified.

The present invention has particular application to the marine industry where it can be used to determine such factors as cost of hull degradation, engine performance, shallow water power levels, efficiency of rudder and steering systems, trim and ballasting underway and electrical power generation. In addition, the present invention has application to other power plant related devices such as railroads and locomotives as well as oil drilling rigs and aircraft.

BRIEF DESCRIPTION OF THE DRAWINGS

The above and other objects of the present invention will become more readily apparent as the invention becomes more fully understood from the following detailed description, reference being had to the accompanying drawings in which like reference numerals represent like parts throughout, and in which.

DETAILED DESCRIPTION OF THE PREFERRED EMBODIMENT

The present invention will now be described with particular reference to its application in the marine industry. However, it will be understood that the principles of the invention are also applicable to the control and operation of systems other than ships, as will become readily apparent.

Figure 1:
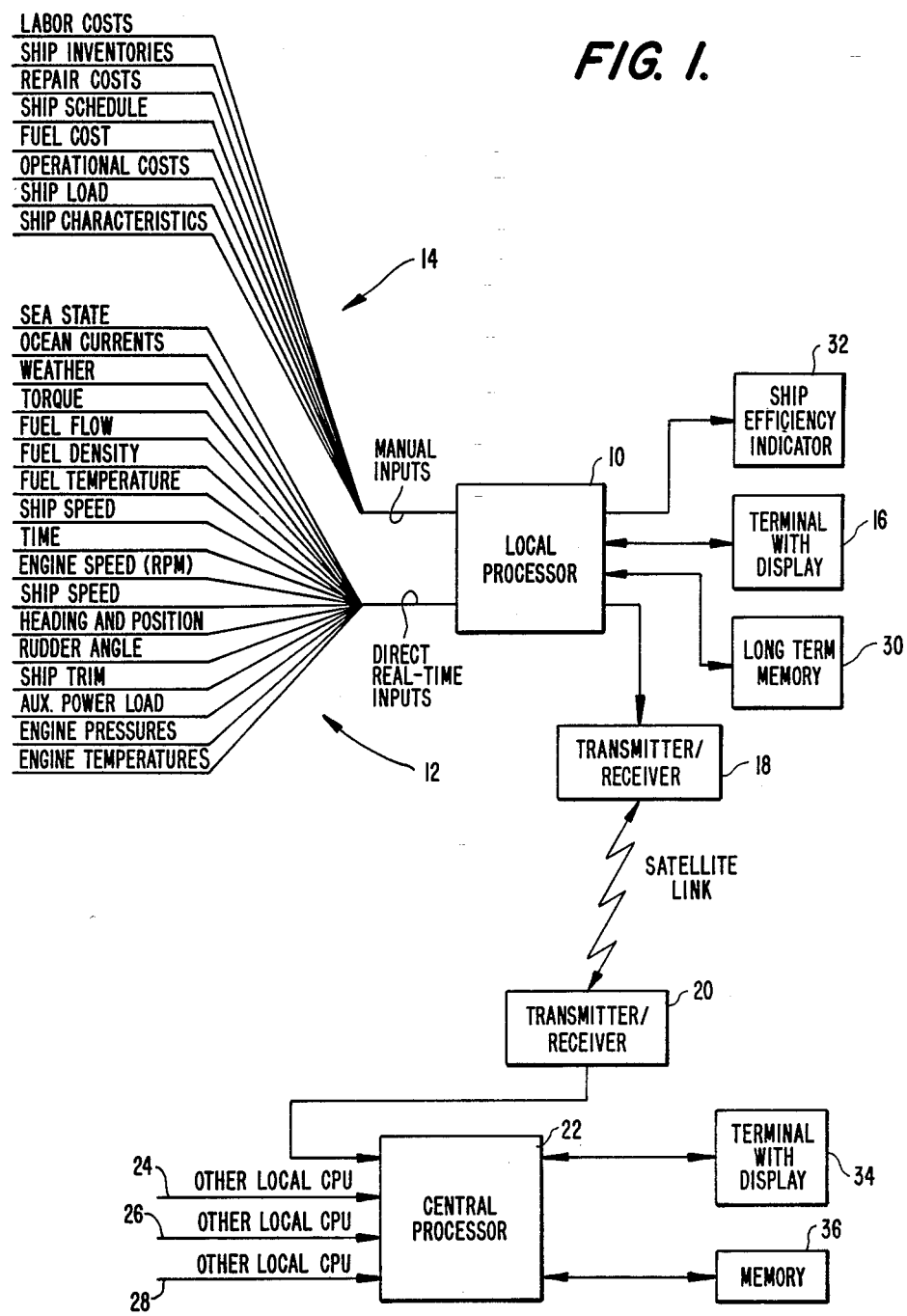
FIG. 1 is a block diagram showing the inputs and outputs for a local processor as well as the transmission link between the local processor and a central processor.

FIG. 1 shows in block diagram form the layout of the components of the present invention. A local processor 10 is positioned on a ship at sea. The processor 10 has a plurality of direct real time inputs 12 and a plurality of manual inputs 14. The direct real time inputs 12 include sensor inputs providing real time indications of, for example, the sea state, ocean currents encountered, weather, torque, fuel flow, fuel density, ship speed, engine speed in terms of rpm, ship heading, rudder angle, ship trim, electrical power load of the ship, pressures internally of the engine, and temperatures internally of the engine. Other inputs may be provided as necessary. My prior U.S. Pat. No. 4,334,425 discloses a system which can be incorporated within the present invention. The disclosure of this patent is incorporated herein by reference.

All conditions and events which provide direct real time inputs into processor 10 are sensed with automated equipment which does not require human interaction. Each input achieves significance in terms of the present invention when combined with other inputs.

The sea state is determined through the use of the ship's autogyro-driven trim indicator which can sense the sea state through interaction of pitch, roll and yaw characteristics of the ship at varying speeds.

Water currents and tides are detected by comparing navigational check points with data in the systems memory for location.

Weather conditions throughout the voyage are sensed and added to the matrix of events that determines the best sailing practice.

Torque use by the engine is measured at the output shaft dynamically with a computerized instrument as described in my aforementioned U.S. Pat. No. 4,334,425. Torque is scaled in foot pounds or in kilograms per square meter, as required.

Fuel flow to the main power plant and auxiliary engines as required is measured with volumetric flow meters.

Fuel density is measured on line in real-time and the density value, combined with flow and adjusted for temperature, produces a true mass flow readout.

Temperature of the fuel flowing to the engine is constantly measured to provide a compensation factor when computing mass flow to insure that fuel heaters are functioning.

Fuel rate is calculated in processor 10 by combining fuel flow with other variables. Various fuel rates are calculated including a fuel rate per horsepower/hour which is produced by combining the fuel flow per horsepower to provide a true real-time flow rate based on power. Also, a fuel rate per mile is calculated by combining fuel flow with ship speed and position. Finally, a fuel rate per cargo (payload) mile is calculated. When total cargo tonnage being moved is combined with the fuel rate per mile, total payload movement is calculated in real time.

The ship's time and date are inputted into data files by the system's internal chronograph. Engine speed (rpm) is determined by the shaft speed of the main power plant in revolutions per minute by the shaft speed sensor disclosed in my aforementioned U.S. Pat. No. 4,334,425. The shaft speed of any auxiliary engines in the power system is measured in the same way. Horsepower is calculated in real-time as the product of shaft speed times torque divided by a suitable number to produce U.S. or metric horsepower equivalents.

Ship speed in knots per hour is measured with a doppler speed device. For redundancy, this number is checked by calculating distance traveled from position input taken from the system's LORAN C link and/or from a satellite navigational device. In this manner, any speed errors from the doppler instrument can be minimized.

The ship heading is continuously monitored from navigational devices on the ship as is the ship position.

Exact rudder position is taken from the ship's auto pilot.

The trim of the vessel on both bow to stern and to side to side is sensed in real-time through the use of autogyroscope devices inside the ship.

Auxiliary power loads are monitored by monitoring devices that take off power from the main engine or use significant amounts of fuel in order to determine the true energy use of the plant or system. The auxiliary power loads include electrical power as well as pump pressures and outflow. Electrical power use is measured in kilowatt hours and the cost for producing that power is calculated.

The pressures and the volumetric output of pumps used for steering, cargo handling and other ship operations are sensed in real-time to alert for critical operating points.

In addition to automated data collection inputted through direct real time inputs, other significant data are input to the system from various points within the network including shipboard operations, and land based fleet management. Fleet manual inputs include repair and maintenance cost, target voyage schedules in the form of a ship schedule, fuel costs, operational costs and the load on a ship for a particular voyage.

The manual inputs may be inputted through a terminal 16. This terminal includes a display and a printer. Furthermore, local processor 10 is connected through a satellite link including transmitter/receiver 18 and transmitter/receiver 20 to a processor 22 contained at the fleet management headquarters. Processor 22 will be referred to as the central processor of the system. Processor 22 is similarly connected to other local CPUs through lines 24, 26 and 28. Accordingly, information can be exchanged between local processor 10 and the central processor 22 through the satellite link.

Local processor 10 includes a memory 30 which provides long-term storage. Memory 30 may be, for example, a disk storage device, a magnetic tape storage device or the like. Finally, local processor 10 is connected to a ship efficiency indicator 32 which will be discussed herein below.

Central processor 22 is also connected with a user terminal 34 and contains a memory 36. In fact, a plurality of terminals 34 may be distributed throughout the various offices of the management headquarters in order to permit different departments access to the information contained in the central processor 22. It will be noted that the manual inputs 14 can be input either through terminal 16 connected to local processor 10 or terminal 34 connected to central processor 22. Certain of these manual inputs are useful primarily in the central processor 22, as will become readily apparent hereinafter.

There are many conditions which the present invention can detect. For example, hull fouling of a ship is a major consideration of a ship owner. The present invention can readily determine the trend of hull degradation by accurately measuring the power required to reach ship speed given similar conditions from a previous trial. This exercise is programmed in the system's power/performance programs and can be a routine part of any voyage.

Furthermore, the use of the main propulsion plant to generate power, for hotel loads, cargo refrigeration, or for dockside power is a common practice. To weigh the fuel penalties occurring in such practices, the system can give a real-time determination of fuel costs by measuring the kilowatt power of electrical generators and the fuel required for power generation.

For hotel loads such as refrigeration carriers or during non-typical voyage situations where heavy shipload electrical power is required, the system can monitor power generation as a fuel or power dependent real-time control. Exact costs of power can be derived from the system log.

At dockside, the use of ship power to generate electricity can prove to be an expensive alternative to shoreside electrical service. Fuel used in such an exercise is directly measurable, along with kilowatt output, to produce costs for such an activity.

Also, the present invention can be used to continuously check the critical indicators of performance in real time. Thus, it can readily identify a fall-off in efficiency, and isolate this from external conditions by recognizing several variations from normal. These include (1) an increase in fuel rate to achieve expected power; (2) an increase in shaft speed to achieve expected power; and (3) fuel flow excursions outside of expected limits.

Furthermore, it is known that passing over shallow bottoms at speed can cause excessive torque, and sometimes damage to the power train system. The real-time aspect of the present invention gives immediate torque values underway so that such situations can be avoided. This can be expressed as an alarm if needed.

Another situation in which the present invention is valuable is analyzing the rudder and steering components. Autopilots that allow too much leeway in steering can add as much as 4 percent to the fuel penalty of a voyage. The present invention can accurately account for such losses in measuring both torque cycling and the fuel rate. Rudder fouling is immediately spotted with the present invention by way of the relation of power required to reach speed.

Fuel savings can also be generated during cruising modes using the present invention. "Slow steaming" and other power conservative sailing techniques are accepted practice in maritime operation today, though little is known of actual savings in fuel outside of estimates and theoretical calculations. The present invention allows for direct measurement of the consequences of such techniques both in terms of fuel saved, time spent, and final voyage costs.

During time-critical voyages, the present invention, with its links to ship position, speed, and fuel being used on a real-time basis, can provide an operator with a moment-to-moment condition report on the voyage, giving the captain full opportunity to gain fuel savings without sacrificing the schedule.

On long voyage legs, the present invention can be used to determine the ideal cruising range of each ship and the ideal or critical speeds/fuel use on any voyage leg so that maximum fuel efficiency can be achieved. It has been determined in this regard that every ship has an ideal cruising range, where a small sacrifice in speed can achieve a large gain in fuel savings.

Also, the use of pumps aboard some types of ships can exact a penalty in fuel use if not coordinated with other ship operations. This applies to pumps used to distribute ballasting, load or unload liquid cargo, or drive steering mechanisms, when the power takeoff for the pump comes from the main engine. The present invention can determine exactly the energy required to drive pumps, and thus compute a measure of their efficiency.

Loads and ballasting can also be optimized using the present invention. Incorrect loading practice and poor ballasting techniques contribute to severe fuel penalties at sea. By using the present invention, the ship can be loaded for best trim using an autogyro technique developed by NASA to provide real-time control over ship attitude when cargo loading is underway, thus eliminating calculating an estimating technique now in vogue. Furthermore, ballast correction can be effected underway. Oil tankers have especially critical ballasting requirements since much of voyage time is spent in this condition. The present invention identifies unusual pitch, roll, and yaw conditions due to improper ballasting and the associated fuel use in real time. Corrective measures can be made during the voyage and the results identified.

Another area in which the present invention can be used is in balancing dual shaft ships. Power loads on dual shaft ships are seldom balanced with normal controls, except through calculation and estimating techniques. The present invention gives actual, real-time control values for each shaft of a dual-shaft vessel so that power may be adjusted for synchronization.

Another area of applicability of the present invention is in controls and alarms. Any measured or calculated condition within the power plant can be linked to external controls or alarms to alert the crew of possible damage. Examples of such use include overtorque and overspeed conditions. Overtorque conditions of any magnitude can be used to set off external controls or alarms to notify the crew of the situation. Overspeed in the form of excess shaft rpm or shaft speed out of autopilot setting can also be used to trip alarms or exercise controls.

Furthermore, stress on a bearing due to overtorque conditions can be treated as an alarm situation or recorded for later analysis. This is a normal function of the torque input from the system.

Vibration of the propulsion shaft in relation to the line shaft bearing is revealed in the system as a series of variables that are easily spotted. This information can forecast bearing wear, shaft misalignment, and other problems along the train.

Propeller damage or fouling can be identified with the present invention since such a condition generates a specific power feedback signal, e.g., torque or shaft speed variation.

The addition of variable pitch propellers into the power train design has introduced a new dimension which must be accounted for in achieving maximum power/fuel use economies. In addition to its real-time capability, the system quickly generates optimum pitch/power curves for use in gaining the best power/speed/pitch ratios.

The present invention can also be used to identify rudder damage. In varying states of sea and weather, rudder damage will not be readily apparent without some means of identifying changes in steering patterns in real time. Variables assigned to this task include rudder angle, navigational trends, and a comparison of power levels to speed over time to identify rudder damage in a real-time environment.

Besides oversteering, either caused by an autopilot or a helmsman, excess play in the rudder linkage can provoke serious steering and power loss problems. The rudder attitude indicator, operating in real time, can detect such a malfunction.

While performing its real-time tasks, the present invention operates continuously to sense, analyze, report and record critical information throughout the voyage, providing the ship crew with data which is not typically available.

When underway in normal conditions, the system reports out its typical power calculations including shaft speed, horsepower, ship speed, etc., and is on the alert for any departures from normal power levels.

While maneuvering in narrow channels and in shallow waters, the system displays power and speed to both the engine room and the bridge, and real-time alerts and alarms can be activated to signal excursions from safety limits.

For tankers and some cargo ships, ballasting underway for the best ship trim can be accomplished without resort to the trial and error methods currently used. The present invention provides a trim indicator readout which gives continuous position of the ship's attitude, and the effect of the trim is seen in real-time on power and fuel rate indicators.

At dockside, cargo loading operations can be speeded with the trim indicator, which reports immediate trim, list, or bow-to-stern displacement as loading is accomplished.

The present invention is linked to LORAN and to weather and navigational satellites to provide still another set of events to apply to the real-time matrix of conditions. Proper power and speed levels can be attained, with assurance that the ship is on course and is operating most efficiently in existing weather conditions.

The present invention provides a continual check on power reserve. The power reserves of the vessel including speed, horsepower, and fuel are continuously observed in real-time by the system. The limits to speed and to power can be determined under real world operating conditions, and these values can be updated to reflect the present condition of the ship and its power plant.

The maximum horsepower of a vessel's power plant, while established at sea trials, can be expected to change as the plant deteriorates, or if changes are made to the engine or propeller. The system can readily check this maximum in real-time as needed to verify that power is available when needed, or to see that unforeseen events, such as engine malfunction or propeller damage, do not reduce power to marginal levels.

Also, given the total fuel capacity of the vessel, the present invention can automatically determine the fuel remaining at any point in the voyage. Using the real-time fuel rate, the present invention can accurately estimate refueling requirements. In addition, by knowing the fuel remaining and its weight, the present invention can continuously update the ship trim calculation to account for the diminishing gross weight.

The design characteristics of the vessel including its size, weight, and operational parameters are programmed into the system as manual inputs to serve as first order benchmarks for continuing efficiency checks and continuously testing real world conditions against design goals or sea trial data. This data base can be updated to account for changes brought about by later modifications, additions and changes, and the like. There is no essential limit to the size of a data base of this kind, nor does the data base have to be stored exclusively shipboard. In fact, the shipboard data base and the fleet data base are interactive and can be accessed by both the ship and by fleet operations. Voyage records are also an essential part of the real-time system, since each serves as a data set upon which the system reaches its decisions. Individual ship records can be stored within the system's memory and access to other records at fleet level can be made through the communications link.

Also, ship inventories play a vital role since repair and replacement parts either carried on ship or available at port are part of the management system. After determining the cause of a shipboard problem, processor 10 or processor 22 can search available inventory and order immediate replacement if the part is available.

Further, the total hours and wage patterns of the ship's crew will be input as a manual input to the system to be used for payroll purposes during long voyages, for determining labor cost needs for unusual events, and for linking to total voyage costs in the real-time mode.

The fleet operations data base accessible through central processor 22 is the collecting point for all ship operations, and serves as the root for historical data in trending and other management tasks. Through resource sharing, this data base is available to all users in the system who have a need.

The satellite communications link is an essential part of the system. The transmitter/receiver 18 and 20 should be capable of fast transmission rates up to 9600 baud in order to make satellite communications feasible and cost-effective. The data bases maintained both on the ships and in management headquarters are linked by this communications link to exchange information quickly and to share common programs. This gives management the capability of literally programming and running the ship system from a remote location. Satellite communication is the key to the real-time capability of the system. Due to the satellite communication link, events taking place on the ship can be immediately transmitted to fleet headquarters.

As discussed above, the central processor 22 will be provided with a plurality of terminals 34 or will be linked to other processors within management headquarters via the network to provide intelligent terminals throughout a corporate operation. Thus, terminals located in operations, finance, maintenance, and supply can be linked and share the same common data base. Each can communicate to each ship in the system in real-time via the satellite link. Network architecture enables the system to function in three modes to further the real-time capability of the invention. These modes are the communications mode, the resource sharing mode and the distributed mode.

LONG-TERM USES OF THE PRESENT INVENTION AS A MANAGEMENT TOOL

A basic quality of the present invention is that records kept and updated are standardized to computer data bases in common use. This permits managers the ability to access and evaluate data over a prolonged period in order to identify characteristics or trends.

For example, for the first time, repair and maintenance managers will have information available instantly on the condition of power systems and will not have to resort to expensive surveys and fact-finding studies to determine repair and maintenance scheduling.

The present invention creates a new way of approaching the maintenance task-working from real world conditions rather than estimates. Mean time between failures can be accurately seen, and such costly operations such as hull cleaning can be ordered only when required and not by some arbitrary schedule.

The same interactive events that spot problems with the power plant and its vehicle can be used as telltale events to warn of trouble areas that can warrant future maintenance action. These include the power plant and the hull.

Any indicator placed to measure power plant function can be used in combination with other indicators to flag power plant deficiencies whether or not they are fuel- or plant-degrading. These include pressures, temperatures, oil or lubricant use, and the like.

Over time, the same indicators that spot hull degradation in real-time can be used to identify long-range maintenance tasks, in that accurate trending can be developed for each ship in a fleet as to when hull degradation must be carefully watched. This would be a function of ship history, the type of hull preservative used, and the typical voyage locations.

Except for a brief trial after major yard repairs are completed, presently, little is done to evaluate ship performance following a shipyard turnover. Because of the valid historical data base, and clear records of recent voyages and prevalent conditions, the present invention can give a fair and accurate evaluation of work done on any ship by any particular shipyard by once again using the real-time power of the invention.

Standard retrofits to the system including propellers, rudders, auxiliary gear, etc., can get checked against original sea trial performance and against manufacturers' specifications in real time. This is merely a matter of formula substitution where the speed, power, and fuel events are applied to the retrofit under evaluation and a comparison is made of real-time performance against expected results.

Without a real-time system, new product evaluation can be a costly endeavor. The performance standards maintained by the present invention, both in its moment-to-moment recording of events and its extensive data base, make it readily adaptable to evaluating the benefits or penalties associated with a new product or innovation—both in terms of performance and cost benefit.

With standard industry practice, major ship overhauls are accomplished every three to five years whether there is warrant for such action or not. Further, without adequate checks against the work performed, owners are not protected against shortcomings in the work product. The present invention is not only capable of determining when overhauls are needed in terms of performance and cost, but is also capable of quickly determining if repairs were accomplished as ordered and whether the ship is functioning according to plan.

Fuel quality surveys can also be carried out using the present invention. In real time, fuel quality surveys are easily performed by comparing fuel grades to power produced, both in terms of brake horsepower per unit or in terms of cost. This is an important function in times of varying petroleum prices and quality. The practice of using substitute grades of fuel, such as bunker, to drive diesels at sea, has an immediate effect on engine efficiency, which is directly measured in real-time by the present invention. The total horsepower delivered is reported, as is the fuel rate per horsepower hour and, ultimately, the cost impact. As will be seen, the immediate cost benefit from using cheaper grades of fuel may not be cost-effective when all real-time parameters are applied.

The use of cheaper fuel may also increase the amount of time and money expended for maintenance, particularly in diesel engines, the system can examine this aspect of such practice over time and arrive at immediate comparisons of the maintenance cycles.

In establishing the proper balance in fuel usage and cost, the total operation must be examined including cost of fuel per mile, engine performance, maintenance and down time. The system incorporates all of these events in real-time to produce the immediate result: The cost-effectiveness resulting from any fuel substitution practice. In addition, the unavailability of premium fuel grades and fuel shortages can force the use of lower grades of fuel. Again, the effects on operational economy can be measured.

SAMPLE PROGRAMS FOR CARRYING OUT THE PRESENT INVENTION

First, it should be understood that each of the direct real time inputs shown in FIG. 1 will be sampled and stored on a periodic basis. Accordingly, the memory 30 of local processor 10 contains a data base storing sequences of the direct real time inputs. This data base must be designed such that each sequence and entry can be accessed by any one of the direct real time input parameters.

The sampling of the direct real time inputs will occur both while the vessel is underway and while it is docked. This sampling also takes place during the initial trial runs when the vessel is theoretically operating at its maximum efficiency. It should also be understood that the frequency of sampling need be no more than, for example, once or twice per day. However, during the initial trial runs of any particular vessel, it is preferable that the vessel be operated in a manner to provide as complete a set of initial data as possible. Once a sufficient set of historical data is stored, the various programs of the system can be run.

Cost of Hull Degradation

Figure 2A:
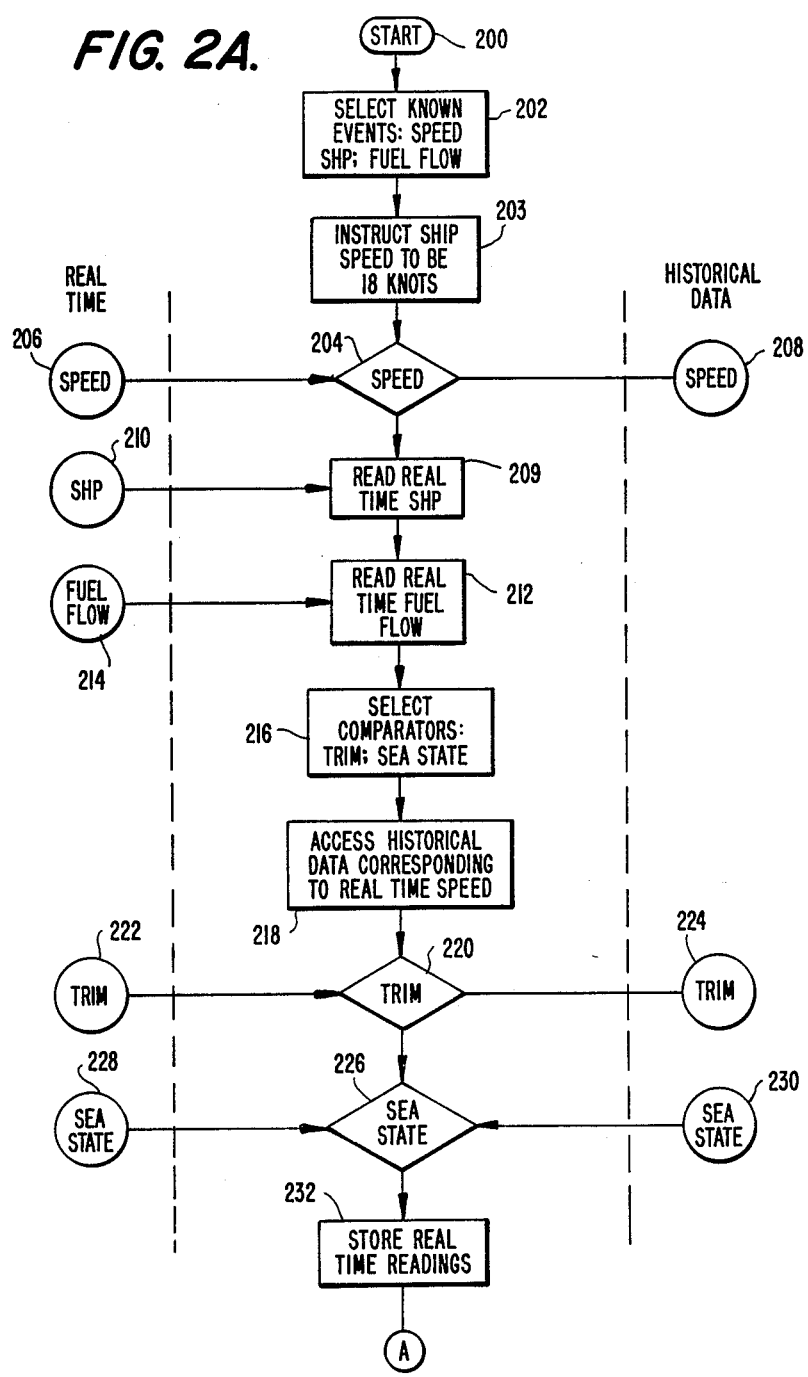
FIGS. 2A through 2C show a flow diagram for determining hull degradation of a ship.
Figure 2B:
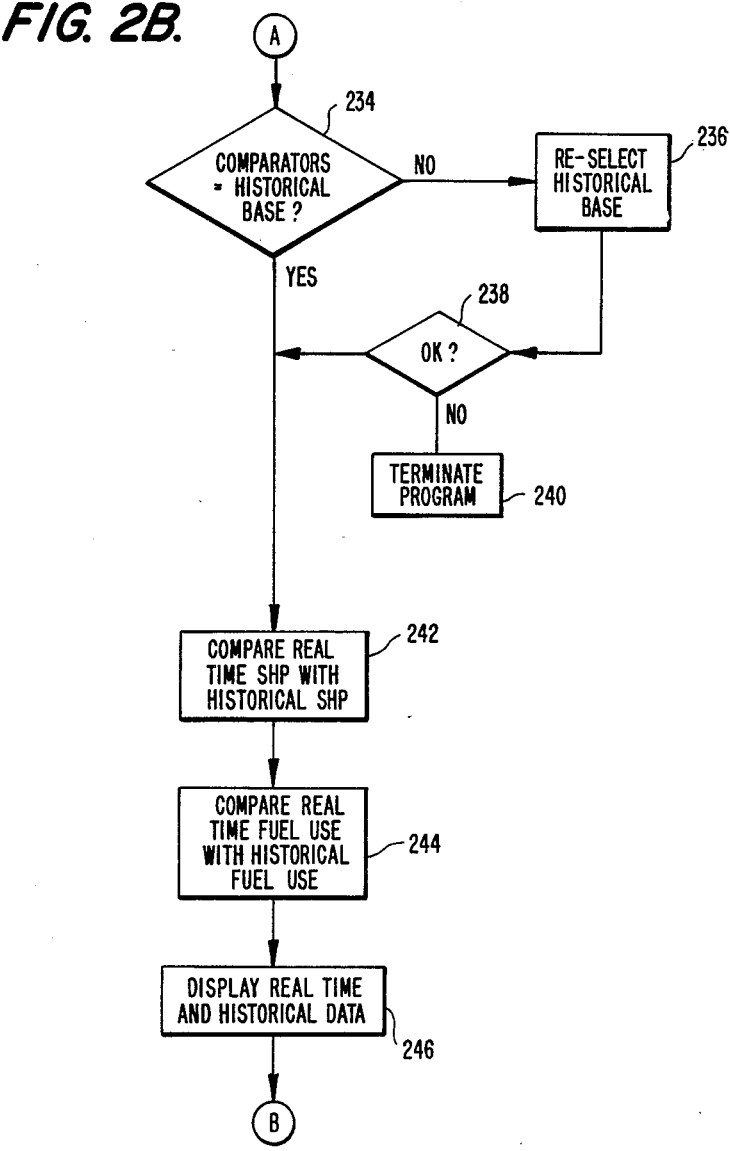
Figure 2C:
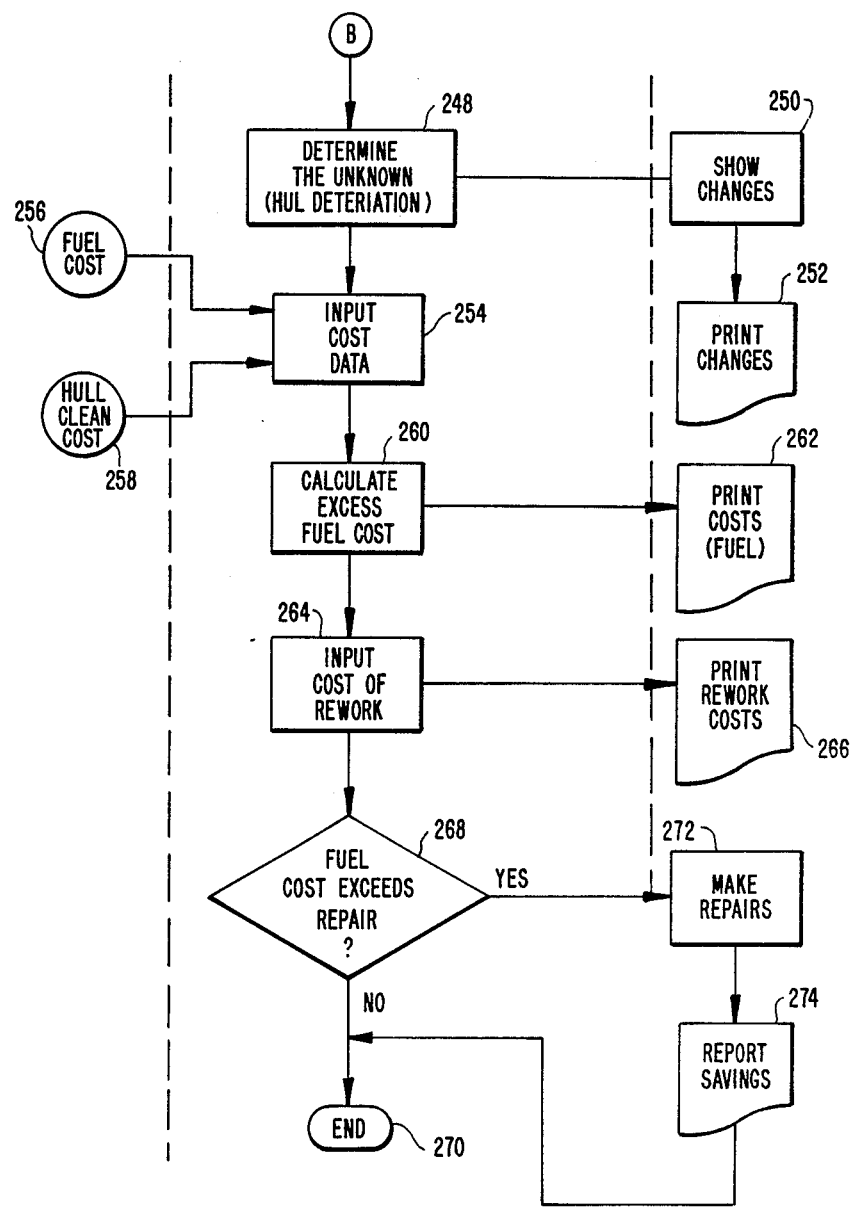

The hull degradation program is shown in FIGS. 2A through 2C. The program is entered by entering an appropriate code into terminal 16 or into terminal 22. Terminal 16 may have a dedicated key marked "HULL" to begin the program if desired.

At step 202, the known events are selected. The known events consist of ship speed, ship horsepower and fuel flow. At step 203, a command is passed to the ship's captain through the display of terminal 16 to maintain the ship speed constant at the speed selected for hull degradation tests. This may be, for example, 18 knots. At step 204, the real-time ship speed is determined from sensor 206 and the historical data is accessed at 208. A real-time speed is compared with the historical data and only the historical data relating to speeds equal to the real-time speed are maintained for comparison. At step 208, the real-time ship horsepower is read from sensor 210 and at step 212, the fuel flow is read from sensor 214. At step 216, the comparators are selected. These comparators comprise trim and sea state. At step 218, the historical data corresponding to the speed read at step 204 is accessed. This historical data relates to the ship horsepower, the fuel flow, the trim and the sea state. At step 220, the ship trim is read from indicator 222 and compared with the trim readings indicated at 224 contained in the historical data. Only that data having trim readings within a predetermined range of the real-time trim reading is kept. Control then passes to step 226 where the real-time sea state is read from indicator 228 and compared to the sea state data 230 in the accessed stored data. Only the data having sea state indications within a predetermined range of the real-time sea state are maintained. At this point, control passes to step 232 where all real-time readings are stored in memory 30 to supplement the historical data for future hull degradation determinations.

Control then passes to step 234 where the real-time comparators are again compared to the historical base to insure correspondence and to insure sufficient historical data to provide an accurate comparison with the real-time data. If the comparators read in real-time do not match the historical base, control passes to step 236 where the historical base may be reselected. It will be noted that in accessing the historical data in step 218, it is not necessary that all data files relating to the particular ship be searched. There may be many years of files in storage and it may only be necessary to access, for example, the previous five years of files. However, if insufficient data is available, the reselection of the historical base in step 236 would access the data files from the beginning of the ship's history. Control then passes to step 238 where a determination is made whether the new data base is adequate. If it is not, control passes to step 240 where the program is terminated. Of course, at this point, the new data has been stored in a historical file to be used in the future. If the new data base is adequate or if the initial comparison in step 234 was adequate, control passes to step 242 where the real-time horsepower is compared with the historical horsepower data. In this step, the program determines whether there has been a trend toward an increase or a decrease in horsepower and determines the difference between the permanent horsepower output and the lowest historical horsepower data stored.

Control then passes to step 244 where the real-time fuel use is compared with historical fuel use. Again, the program determines trends in fuel use and whether the fuel usage has increased or decreased over time. Additionally, the difference between the present fuel usage and the lowest stored fuel use data is calculated. Control then passes to step 246 where the real-time and historical data are displayed. Such a display could be in the following form:

| Speed (KTS) | SHP | Fuel Use bbl/hr | Trim | Sea State | Date/Time |
|---|---|---|---|---|---|
| 18 | 20000 | 850 | −4 | 4 | 4/1/82 12:00 |
| 18 | 20500 | 860 | −3 | 3 | 4/2/83 12:00 |
| 18 | 21500 | 870 | −4 | 4 | 7/1/84 12:00 |
| 18 | 22500 | 890 | −4 | 3 | 10/1/84 12:00 |
| This is the Real-Time Indicator: | | | | | |
| 18 | 23000 | 900 | −4 | 3 | 1/1/85 12:00 |

It will be noted that the date and the time of each entry is recorded and displayed in addition to the pertinent data. It will also be noted that the sea state and the trim figures are constant within a predetermined range and the speed is also constant. Had these events shown any significant variance, the program would have rejected the data and selected another set of hull trial values from the historical data base more closely corresponding to the real-time condition. The variance permitted and any parameter can be determined based on ship characteristics, etc.

Control then passes to step 248 where the hull deterioration is determined as a function of a change in horsepower and fuel use. This calculated data is then passed to a subroutine starting with step 250 which displays the changes on a shipboard display and prints the changes in hard copy at step 252. The display comprises changes in the various variables as well as an indication of the excess horsepower and excess fuel used. The format of the display can be as follows:
Changes in the Value of the Known Events:

| Speed (KTS) | SHP | Fuel Use bbl/hr | Trim | Sea State | Date/Time |
|---|---|---|---|---|---|
| 0 | +3000 | +50 | 0 | 0 | 1/1/85 12:00 |

An Excess of 3000 hp/hr=72,000 hp/hr Per Day
An Excess of 50 Barrels Fuel/hr=1200 Barrels Per Day At step 254, the fuel cost and hull cleaning cost data are read in from their memory locations at 256 and 258. At step 260, the excess fuel cost is calculated and printed at 262. At step 264, the cost of cleaning the entire hull is determined and printed at 266. At step 268, a determination is made as to whether the fuel cost exceeds the cost of repair for a predetermined time. If the answer is "no" the program is ended at step 270. If the answer is "yes" a display is presented at step 272 warning that the operation costs exceed the cost to repair. This display may have the following format:
Ship Name
Date of Last Hull Reconditioning: 3/1/82
Cost: $2,100,000
Scheduled Days Underway, 1985=250
Cost of Hull Condition, 1985= +$8,700,000
Estimated Cost of Hull Reconditioning, 1985=$3,200,000

* Warning: Operation Costs Exceed Cost to Repair*

Estimated Excess Fuel Costs, 1985=$5,500,000

At step 274, a printout is made of the savings to be expected by making immediate repairs. The program is then ended.

It will be understood that at any point in the program where a display is presented, the information displayed may also be transmitted through the satellite data link to the central processor 22 for display and/or storage. In a system wherein decisions to clean the hull are made only at the central office, the program of FIGS. 2A through 2C may be carried through step 232 onboard ship and the results transmitted to the central processor 22 where the remainder of the program is carried out. Numerous other variations are possible depending upon the setup of the particular shipping operation.

As will be understood from the foregoing, an important aspect of the invention is that real-time variables relating to a particular unknown parameter are measured and compared against historical data to determine the unknown parameter.

Figure 3:
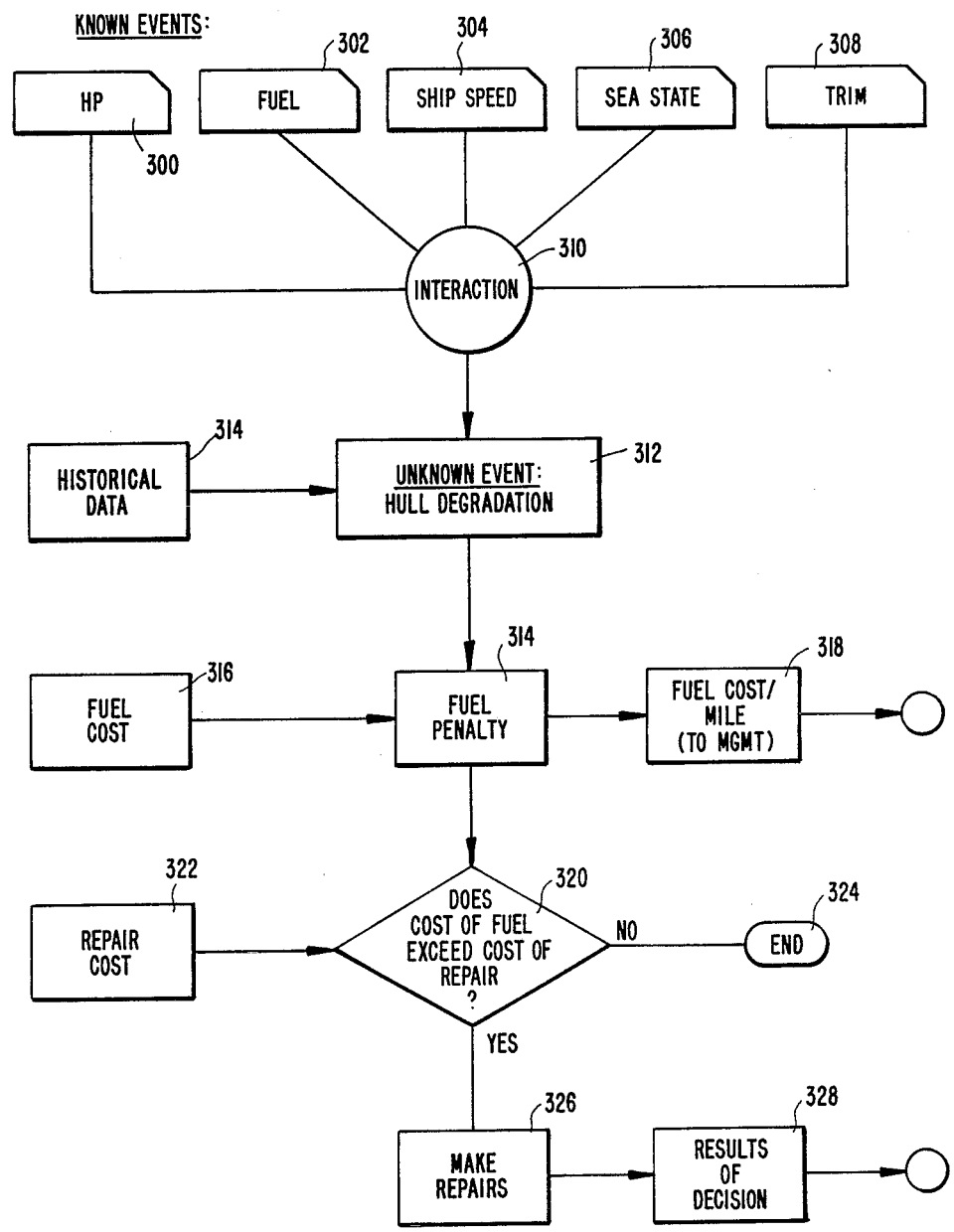
FIG. 3 shows a generalized flow diagram for determining the cost penalty of an inefficient system.

FIG. 3 shows a shorthand flow chart for determining the cost of hull degradation. This flow chart corresponds to that of FIGS. 2A through 2C and shows that the known events indicated by blocks 300, 302, 304, 306 and 308 comprising the real-time horsepower, fuel, ship speed, sea state and trim interact as shown by block 310. Block 310 indicates that the interaction takes place by constraining certain of the known events to predetermined ranges as discussed above. Block 312 then indicates that historical data from block 314 is used in connection with the interaction of the known events to determine an unknown event-in this case hull degradation. Once the hull degradation is determined, the fuel penalty is calculated in block 314 by reading the fuel cost from block 316. The fuel cost per mile is then transmitted to management in block 318 and decision step 320 determines whether repair should be effected by inputting the repair cost from block 322. If the cost of fuel does not exceed the repair cost, the program is ended at block 324. On the other hand, if the fuel cost does exceed the cost of repair, a decision is made in block 326 to make the repairs and the results of the decision are displayed on the appropriate display either onboard ship or in management headquarters. It is noted that each time the known events are sensed, the interaction block 310 includes storing these known events to act as historical data the next time the program is run.

Figure 4:
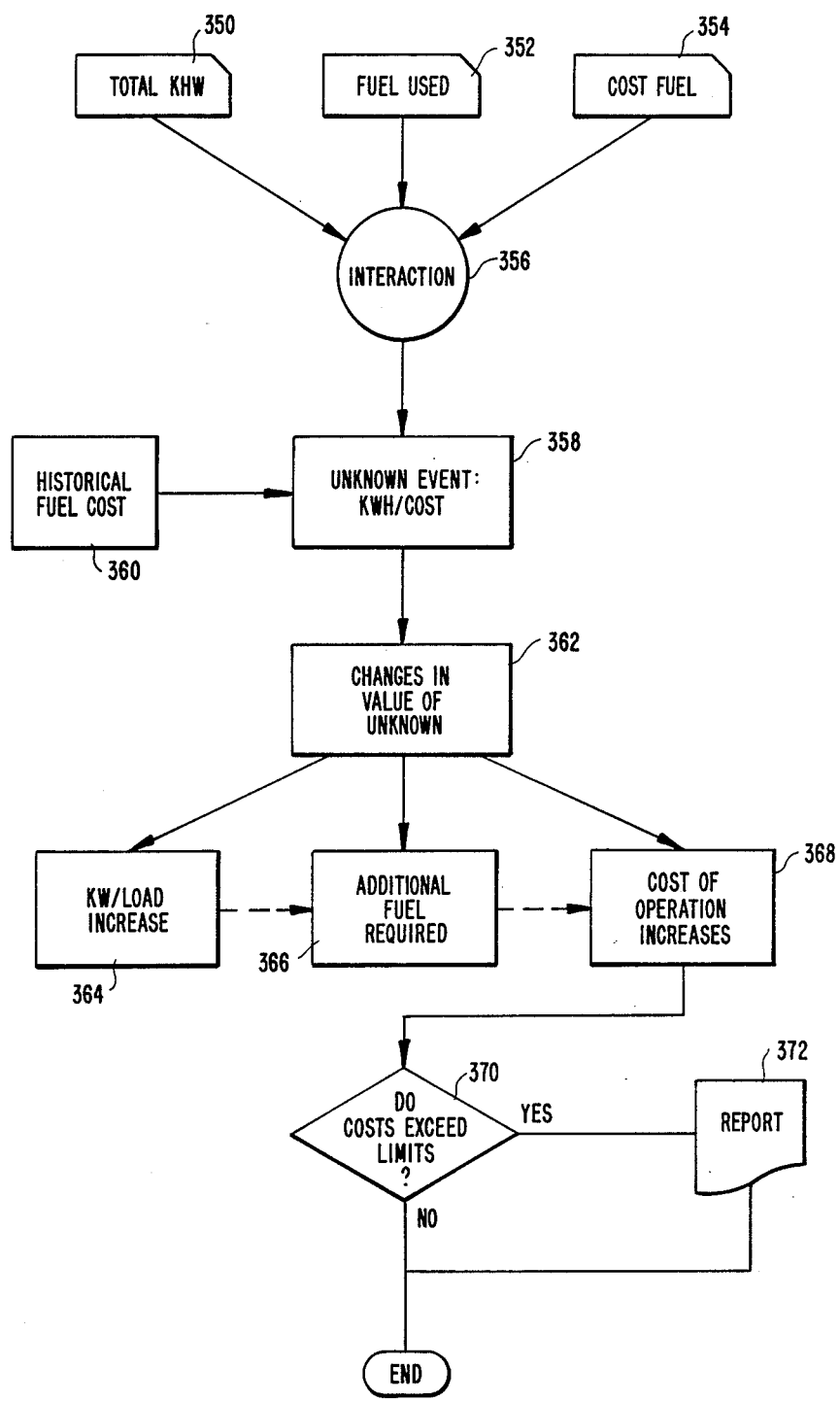
FIG. 4 shows a flow diagram based on the model of FIG. 3 for determining the cost of excess electrical load.

The principles of the present invention can be applied to many of the ship's systems. FIG. 4 shows a shorthand flow chart for determining the cost of electrical power generation aboard ship. The known events indicated by blocks 350, 352 and 354 are total kilowatt hours, fuel used and cost of fuel, respectively. Interaction takes place as indicated by block 356 and the unknown event which is the cost per kilowatt hour is calculated in block 358. The historical data relating to this unknown event is read as indicated in block 360 and the changes in the value of the cost per kilowatt hour are determined in block 362. The increase in the kilowatt load over time is then calculated in block 364 and the additional fuel requirements are calculated in block 366. The cost of this additional fuel is calculated in block 368 and a decision is made in block 370 as to whether the additional costs exceed predetermined limits. If the answer is "yes" a report is produced in block 372 and afterwards the program ends. Alternatively, if the excess costs do not exceed the predetermined limits, the program ends.

The program of FIG. 4 is useful in determining both changes in the cost per kilowatt hour as the kilowatt load increases and changes in the kilowatt load over time.

Figure 5:
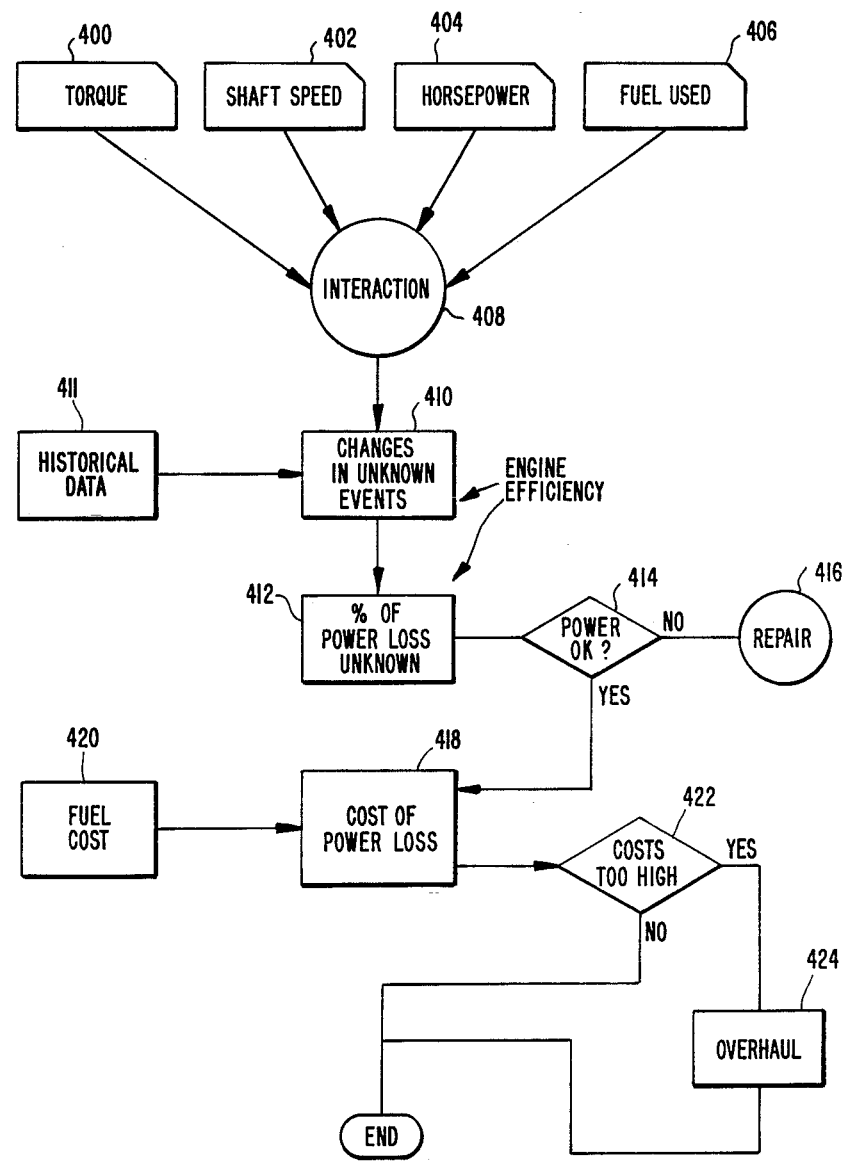
FIG. 5 shows a flow diagram based on the model of FIG. 3 for determining the cost of inefficient engine performance.

FIG. 5 shows a shorthand flow chart for determining inefficient engine performance. The performance of an engine is evaluated in regard to two essential criteria—that is, developing its designed horsepower throughout the range of its operating speed, and use of fuel in the most efficient manner. To make these determinations, four known events are monitored as shown in blocks 400, 402, 404 and 406, these known events are torque, shaft speed, horsepower, and fuel used. These variables interact as indicated by block 408 by holding shaft speed in terms of rpm constant. During the interaction part of the program, a command may be sent to the bridge to maintain, for example, the engine rpm at 110. In block 410, the historical data is read as indicated by block 411 and the engine efficiency is monitored by comparing the real-time fuel used, the real-time horsepower and the real-time torque against the historical data. This information is displayed on the ship monitor as follows:

| RPM | TQ × 10 × 1000 | HP | Fuel Use bbl/Hour | Date | Time |
|---|---|---|---|---|---|
| 110 | 800 | 27000 | 860 | 2-5-84 | 14:50 |
| 110 | 750 | 26000 | 870 | 6-10-84 | 12:01 |
| 110 | 730 | 25500 | 890 | 9-10-84 | 16:20 |
| This is the Real Time Indicator: | | | | | |
| 110 | 700 | 24800 | 910 | 2-1-85 | 15:40 |

It will be noted from the above that the rpm remains constant while the torque and horsepower decline. Fuel use, on the other hand, is rising. This is indicative of a power loss due to inefficient engine performance. The seriousness of the power loss is determined in step 412 where the maximum change in the known events is calculated and displayed as follows:

| RPM | TQ × 10 × 1000 | HP | Fuel Use bbl/Hour | Date | Time |
|---|---|---|---|---|---|
| 0 | −70 | −1500 | +30 | 2-1-85 | 15:42 |

A Decrease of 70,000 ft. lbs. Torque=10%
A Decrease of 1500 hp/hr=10%
An Increase of 30 Barrels of Fuel/hr=720 Barrels Per Day The calculated information can be transmitted to fleet management. As part of block 12, the system can be set to transmit this information automatically if the inefficiency level reaches a certain point. For example, in the present case, management has elected to set a flag so that if engine inefficiency reaches 10 percent, the fleet office will be automatically alerted and the foregoing data is automatically transmitted through the satellite communication link. In this case, the following steps can be carried out either at fleet management headquarters or both at headquarters and onboard ship. These steps comprise step 414 at which a decision is made as to whether the power being generated is sufficient to keep the ship running. If not, the decision to repair the engine by overhaul is made at step 416. If sufficient power is being generated, the cost of the power loss is calculated in block 418 where the fuel cost is read from the data stored at block 420. The monitor provided at the fleet headquarters or both at the fleet headquarters and onboard ship then displays the calculated values as follows:

Ship Name; Engine Performance 2/1/85; 15:43 GMT
Decrease of 70,000 ft. lbs Torque=10%
Decrease of 1500 hp/hr=10%
Increase of 30 Barrels of Fuel/Hr=72 Barrels Per Day
Cost of Engine Inefficiency=72 * $29.00=$2,088 Per Day At step 422, the cost of the operating inefficiency is compared to the cost to overhaul the engine. If the power loss cost is significantly less, this fact is displayed and the program is ended.

If the costs of the power loss are too high, control passes to block 424 where the significant data is displayed as follows:
Ship Name
Date of Last Engine Overhaul: 3/1/82; Cost: $800,000
Estimated Time for Overhaul=10 Days
Scheduled Days Underway, 1985=250
Cost of Plant Inefficiency, 1985=$520,000

*Caution: Plant Costs are Approaching Cost to Repair*

To aid in the decision-making process, fleet management can call upon the vessel operating schedule which is stored in the data base. This operating schedule includes layovers and dockside availability. The display screen for this information would look as follows:
Ship Name; Report Date 2/1/85; 16:20
Short-Term Schedule Requested:

| Voyage | Sail Date | At Sea | Arrive Date |
|---|---|---|---|
| New York/Capetown | 2/6/85 | 10 | 2/17/85 |
| Capetown/Lisbon | 2/25/85 | 6 | 3/5/85 |
| Lisbon/Miami | 3/20/85 | 6 | 3/26/85 |
| Miami/New York | 4/20/85 | 5 | 5/1/85 |
| Envelop of Dockside Availability: | | | |
| New York | 0 Days | | |
| Capetown | 8 Days | | |
| Lisbon | 15 Days | | |
| Miami | 25 Days | | |

From the above display and the engine overhaul display indicating that 10 days are required for overhaul, it can be seen that there are only two ports in which a 10-day or greater layover is scheduled and in which engine overhaul can take place. This system is programmed to further determine this fact and access the cost for repair at each of the possible repair sites. This information is displayed as follows:

Survey of Repair Yard Costs-Engine Overhaul-1984 Base
Lisbon $92,000/Day; Estimated Total Costs $920,000
Miami $106,000/Day; Estimated Total Costs $1,060,000

*Warning: Lisbon Repair Facility Not Showing Active Status*

It is noted that the last line of displayed information comprises data which can be input to the systems data base on a regular basis, if available. From the foregoing display, it can be seen that the only available port for repair is in Miami and that the only available time for repair is in May.

Shallow Water Power Levels

Operating a vessel in shallow water can cause a reduction in speed, a corresponding elevation in torque and fuel use, and in some cases serious over-torque conditions can occur which might damage the shaft or bearings. By monitoring rpm, ship speed, torque and fuel use in real-time and keeping track of short-term changes in these quantities, adverse effects of shallow water on the engine can be detected and avoided.

When shallow water is encountered, rpm remains constant, the ship's speed decreases, torque shows a marked, sudden increase, and fuel use increases. This interaction can take place within moments.

Figure 6A:
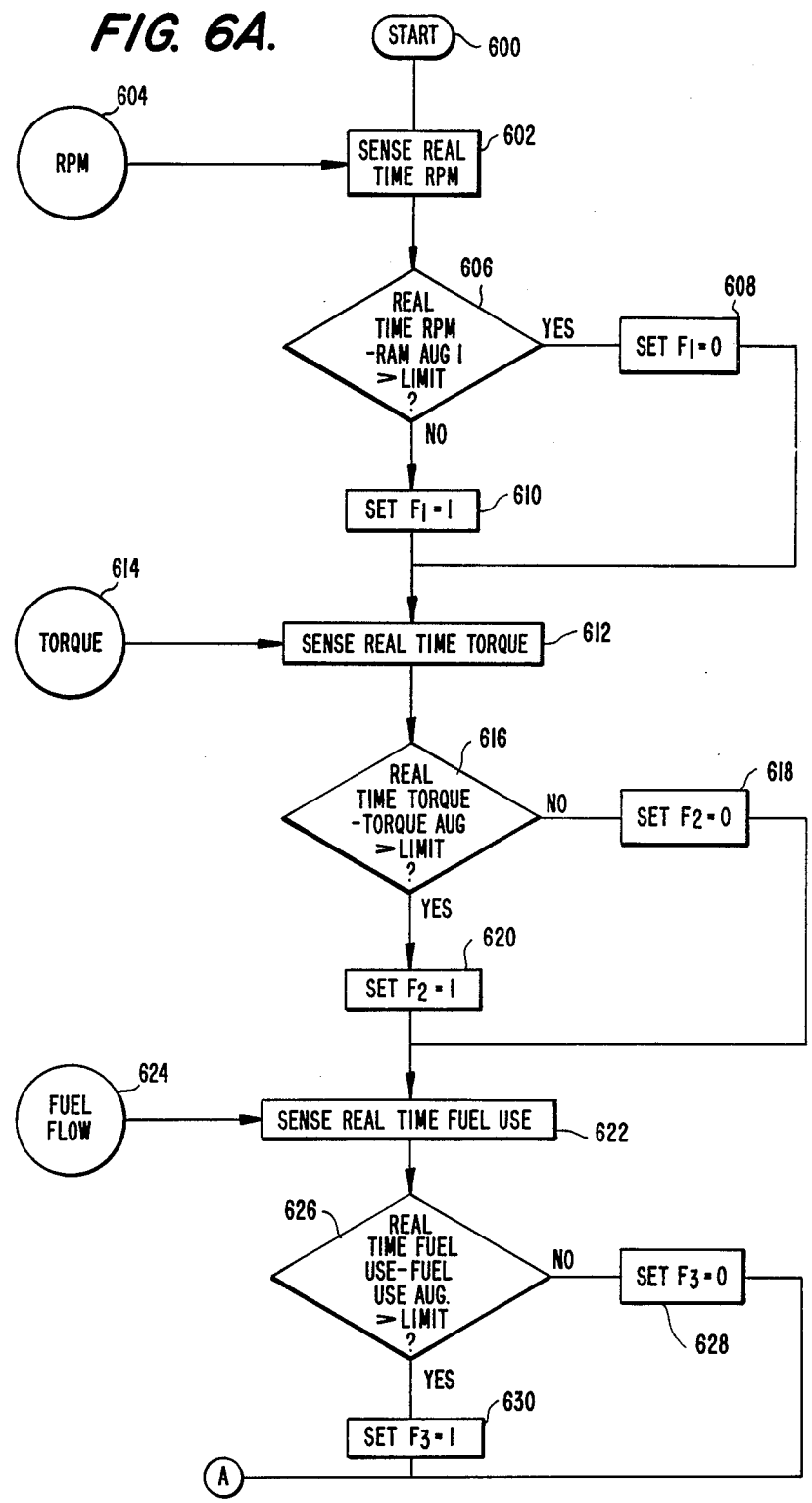
FIGS. 6A-6B show a flow diagram for determining a shallow water condition.
Figure 6B:
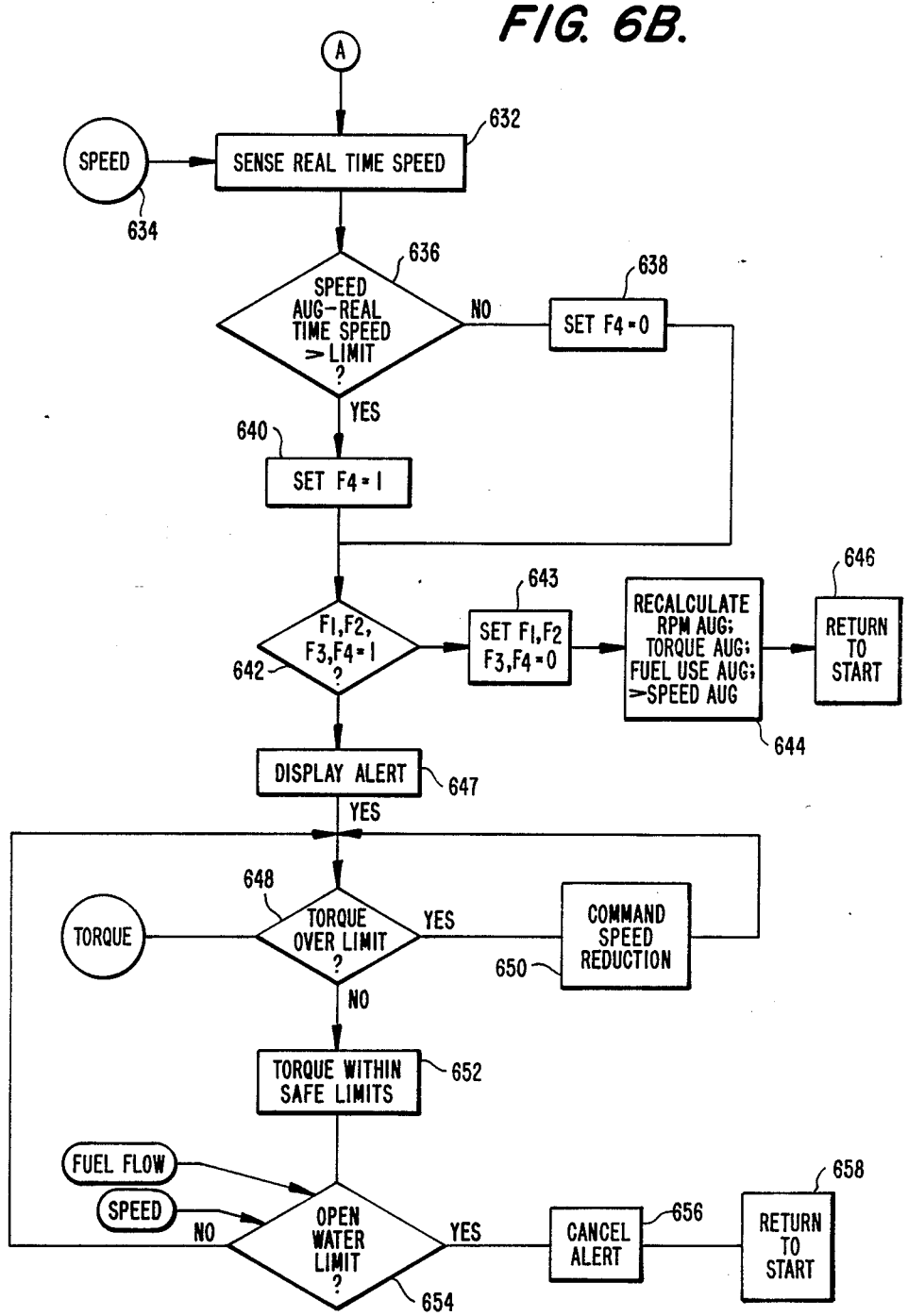

Referring to FIGS. 6A and 6B, a program is shown for detecting the effects of shallow water sailing. The program starts at step 600, and at step 602, the real-time rpm is sensed from sensors 604. In step 606, a determination is made as to whether the rpm is remaining constant or changing. In order to do this, the absolute value of the difference between the real-time rpm and the rpm average is compared to a limit. If the difference exceeds the limit, the real-time rpm is determined to not be constant and the flag $F_1$ is set to 0 at step 608. Otherwise, flag $F_1$ is set to 1 at step 610 indicating that rpm is constant. It will be noted that the rpm average is calculated over a set number of previous readings. For example, five previous readings may be used to determine the average period.

Control passes to step 612 where the real-time torque is sensed from element 614. At step 616, the torque average is subtracted from the real-time torque and this difference is compared to a limit to determine whether or not the real-time torque is increasing or not. If the torque is remaining the same or decreasing, flag $F_2$ is set to 0 at step 618. If the torque is increasing, flag $F_2$ is set to 1 at step 620. Control then passes to step 622 where the real-time fuel use is monitored from fuel flow sensor 624. At step 626, a determination is made whether the fuel use is increasing by subtracting the average fuel use from the real-time fuel use and comparing this difference to a limit. If the fuel use is remaining the same or decreasing, flag $F_3$ is set to 0 at step 628. If the fuel use is increasing, flag $F_3$ is set to 1 at step 630. Control then passes to step 632 where the real-time speed is sensed from speed sensor 634. In step 636, a determination is made as to whether the real-time speed is decreasing by subtracting the real-time speed from the speed average signal. If the speed is increasing or remaining constant, flag $F_4$ is set to 0 in step 638. If the speed is decreasing, flag $F_4$ is set to 1 at step 640. In step 642, a determination is made whether all of the flags $F_1$, $F_2$, $F_3$, and $F_4$ are equal to 1. If not, the flags are all set to 0 at step 643 and the rpm, torque, fuel use and the speed averages are recalculated using the most recent real-time values. In each case, for example, five values may be used to form the average. The most recent real-time value will then be substituted for the earliest of the readings in the previous average. This is carried out in step 644 after which the program returns to start at step 646. The program may be run at a periodic basis.

If all of the flags are set to 1 at step 642, this means that a shallow water condition has begun. Accordingly, at step 647, an alert is displayed as follows:

*Warning: Shallow Water Encountered*

In addition, the pertinent readings leading up to the shallow water condition are displayed as follows:

| Ship Name | | Running Log 2/5/85 | 12:32 GMT | |
|---|---|---|---|---|
| RPM | Speed | Torque × 1000 | Fuel Use bbl/Min. | Time |
| 112 | 18 | 600 | 1.3 | 12:33 |
| 112 | 19 | 550 | 1.1 | 12:23 |
| 112 | 20 | 500 | 1.0 | 12:13 |

Caution: Torque Limit is 650,000

At step 648, the real-time torque is again sensed and compared to the ship's torque limit. If an over-torque condition exists, a speed reduction is commanded at step 650 and the ship's display reads as follows:

Alert: Reduce Engine Speed to 100 RPM*

Control passes from step 650 to step 648 where the torque is again checked for an overlimit condition. If no overlimit condition exists, control passes to block 652 where the display indicates that the torque is within safe limits. Control then passes to step 654 where the torque, fuel flow and speed real-time parameters are compared with values expected in open water conditions. The ship's display is updated with the latest sensed values as follows:

| RPM | Speed | Torque × 1000 | Fuel Use bbl/Min. | Time |
|---|---|---|---|---|
| 100 | 18 | 550 | 1.2 | 12.36 |
| 100 | 18.5 | 550 | 1.2 | 12:37 |
| 100 | 17.5 | 570 | 1.3 | 12:38 |
| 100 | 18 | 560 | 1.2 | 12:39 |
| 100 | 19 | 550 | 1.2 | 13:10 |
| 100 | 19 | 550 | 1.1 | 13:11 |
| 100 | 19 | 500 | 1.0 | 14:01 |

If the open water limits are not found, control again passes to step 648 where the torque is checked for an overlimit condition. If open water conditions are met, control passes to step 656 where the alert is cancelled using the following display:

*Alert: Shallow Water Condition Not Evident*

*Increase Engine Speed to Cruising Level*

Control then passes to step 658 which returns to start 600.

The program of FIGS. 6A and 6B can be run at any desired interval. Updating the response in step 654 would preferably run at a more frequent interval on the order of one minute or less to constantly monitor torque overconditions and the shallow water condition.

Rudder Condition

Figure 7:
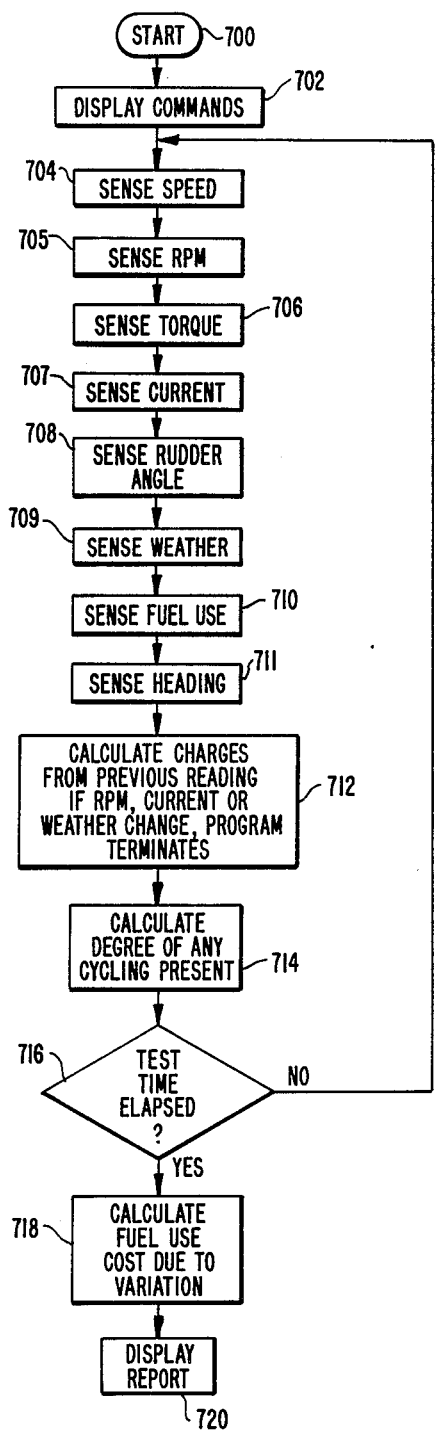
FIG. 7 shows a flow diagram for determining an inefficient rudder condition.

The present invention can determine if there is rudder damage, or if a malfunctioning autopilot or faulty navigation system is causing a variation in heading and thus a loss in fuel. FIG. 7 shows a generalized flow chart for determining rudder condition.

The program starts at step 700 and at step 702 the shipboard commands are displayed for initiating the rudder condition test program. The program requires a predetermined time to execute. During this time, for example, 12 hours, the ship must maintain the same speed and heading. Accordingly, the following commands are displayed on the shipboard monitor:

*This Analysis Will Take 12 Hours*

*Maintain Same Speed and Heading*

In blocks 704 through 711, the ship speed, engine rpm, torque, ocean currents, rudder angle, weather, fuel use and heading are monitored. Of these, the rpm, current and weather must be within predetermined limits in order for the rudder angle condition to be determined. In step 712, changes in the measured readings are calculated and stored. If rpm, current or weather change beyond predetermined limits, the program ends.

In step 714, any cycling is calculated. Cycling can be determined by calculating whether any present reading is equal to or falls between the limits of the previous readings.

In step 716, it is determined whether the test time of 12 hours has elapsed. If not, control returns to step 704 where the parameters are sensed once again. The number of times that these parameters are sensed per hour is a matter of choice. However, a sufficient number of samples must be taken to insure a valid test. In step 718, the cost of the variation in fuel use is calculated by subtracting the maximum fuel use figure from the minimum fuel use figure and then multiplying this by the cost of the fuel. In step 720, a report is displayed comprising the pertinent readings and the pertinent findings. The report could have the following format:

| | Ship Name 1/11/85 13:05 GMT | | | | |
|---|---|---|---|---|---|
| | Position: Lat 20° 17' Lon 30° 45' Heading: 345° | | | | |
| | Condition: Autopilot on | | | | |
| Speed | Torque × 1000 | Rudder Angle | Fuel bbl/Min. | Heading | Time |
| 18 | 670 | +2 | 30 | 343 | 13:05 |
| 17 | 660 | 0 | 28 | 340 | 14:05 |
| 16 | 650 | −1 | 27 | 345 | 15:05 |
| 15 | 680 | −3 | 32 | 351 | 16:05 |
| 16 | 690 | −1 | 33 | 348 | 17:05 |
| 17 | 700 | +1 | 33 | 345 | 18:05 |
| 18 | 720 | +3 | 35 | 351 | 19:05 |

Findings in 12-Hour Rudder Survey:
Torque is Cycling by 7200 ft. lbs.
Fuel Rate is Cycling by * bbl/Min.
Rudder Angle is Exceeding 2° During 45% of Voyage Time
Heading is Cycling by −5° to +6°

At this point, it is evident from the display that the known events are cycling, indicating some measure of autopilot malfunction or other rudder damage. This information is immediately relayed to fleet headquarters. Further analysis can be undertaken at fleet headquarters. This display at the fleet headquarters would read as follows:
Ship Name; 1/12/85; 1:30 GMT
Position: Lat 20° 17'; Lon 30° 45'; Heading: 345°
Result of Rudder Survey
Condition: Autopilot on
Excess Fuel Used=7 bbl/hr=168 bbl/Day
Cost of Fuel Used=168 * $29=$4,872 Per Day
Scheduled Days Underway 1985=250
Estimated Cost of Rudder Malfunction 1985=$1,218,000

The decision is then made at fleet headquarters to repair and, if necessary, replace the autopilot. This action is validated on the next voyage by means of the same rudder condition program.

Mass Fuel Flow

Figure 8:
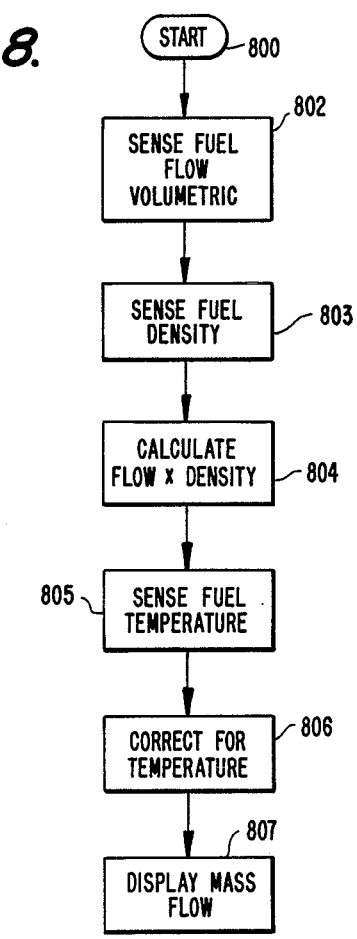
FIG. 8 shows a flow diagram for determining volumetric fuel density.

The present invention can also be used to determine mass fuel flow as shown in FIG. 8. The program starts at step 800 and the volumetric fuel flow is sensed at step 802. The fuel density is sensed at step 803 and the flow times density is calculated in step 804. In step 805 the temperature of the fuel is sensed and in step 806 the calculated value is corrected for temperature. In step 807, the corrected mass flow is output.

Ship Efficiency Indicator

Figure 9:
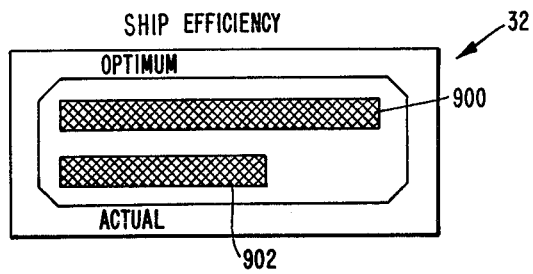
FIG. 9 shows an enlarged view of the ship efficiency indicator.

FIG. 9 shows the ship efficiency indicator 32 which provides a constant readout of the actual ship efficiency as compared to the optimal efficiency expected under the present operating conditions. A bar graph 900 represents the optimum efficiency which is calculated based on historical data. The second bar graph 902 represents the actual operating efficiency of the ship at the present time. The quantity displayed by the analog bar graph 902 is obtained by determining the ratio of the current value of miles through the water per barrel of fuel consumed whereas the bar graph 900 is representative of the same quantity derived from historical data and presented as a reference value. The reference values may be derived by interpolation from a table stored in the memory. By the use of indicator 32, an operator can directly observe the effect of changes in factors affecting efficiency. Every action to improve or degrade fuel performance will be reflected immediately by movement of the bar graph 902. Because relative changes are the medium of action and response, the choice of the reference curve stored in memory is not the critical factor. Initial values are programmed from vessel design information. Optimal values based on operating experience can be substituted after analysis, if that is desired.

The ship efficiency indicator 32 will provide an immediate indication of the cost or benefit of changes in certain variables. For example, savings of several percent of fuel for a given speed can be obtained by optimizing trim while underway. Another variable is the "balance" between shafts for a twin screw vessel. In other words, the cost or benefit of various adjustments to minimize the negative interaction between shafts when unequal power and/or rpm are provided to the shafts will be displayed. Still another factor is steering. It is well known that even a well functioning steering system can be operated over a range of control conditions, only one set of which can be optimal at any given time. Still other areas amenable to control and optimization are boiler and condenser conditions, especially at slow steaming, where design charts may be of little use in guiding engineers.

The ship efficiency indicator emphasizes real-time response to key performance indicators. The best real-time control strategy must include prompt indication of the actual effect of adjustments made by shipboard personnel. Prompt display of the result of a change allows direct optimization of fuel economy.

The foregoing description is set forth for purposes of illustrating the present invention but is not considered to be limitative thereof. Clearly, numerous additions and changes can be made without departing from the scope of the invention, as set forth in the appended claims.

What is claimed is:

1. A dynamic real-time management system for managing the operation of a powered system, comprising:
   (a) a microprocessor for sensing a plurality of real-time parameters associated with said powered system and having means for receiving operation information related to the operation of said powered system;
   (b) a memory for storing sensed values of said real-time parameters and storing a plurality of programs for defining relationships between certain of said sensed values of said real-time parameters;
   (c) a terminal with a display for communicating with said microprocessor; and
   (d) wherein said microprocessor is programmed to automatically determine a plurality of unknown conditions of said powered system as a function of said sensed values of said real-time parameters and said operation information by individually selecting said unknown conditions to be determined, selecting the real-time parameters necessary to determined said selected unknown conditions, determining interactions between said sensed values of said selected parameters using said stored programs and producing an interaction indication result, relating said interaction indication result to said operation information using said stored programs, producing a condition output indicative of the relationship of said operation information and said interaction indication result, and displaying said condition output on said terminal, and wherein said microprocessor is programmed to determine said interactions by commanding that certain of said real-time parameters be held constant to act as comparators in order to sense changes in other of said real-time parameters.

2. The system as set forth in claim 1 wherein said stored sensed values of said real-time parameters include historical data stored in data groups identifiable in accordance with said real-time inputs which are held constant.

3. The system in accordance with claim 1 wherein said powered system is a marine vessel having a power generation plant and one of said automatically determined conditions is hull condition of said vessel, said real-time parameters selected to determine hull condition being vessel speed, shaft horsepower, fuel flow, vessel trim and sea state, and wherein vessel speed, trim and sea state are held constant in real-time and real-time values of horsepower and fuel flow are compared with historical horsepower and fuel flow data corresponding to said constant real-time speed, trim and sea state.

4. The system as set forth in claim 3 wherein excess fuel use due to hull fouling is calculated and wherein cost of said excess fuel use is calculated.

5. A dynamic real-time management system for managing the operation of a powered system, comprising:
   (a) a microprocessor for sensing a plurality of real-time parameters associated with said powered system and having means for receiving operation information related to the operation of said powered system;
   (b) a memory for storing sensed values of said real-time parameters and storing a plurality of programs for defining relationships between certain of said sensed values of said real-time parameters;
   (c) a terminal with a display for communicating with said microprocessor;
   (d) wherein said microprocessor is programmed to automatically determine a plurality of unknown conditions of said powered system as a function of said sensed values of said real-time parameters and said operation information by individually selecting said unknown conditions to be determined, selecting the real-time parameters necessary to determined said selected unknown conditions, determining interactions between said sensed values of said selected parameters using said stored programs and producing an interaction indication result, relating said interaction indication result to said operation information using said stored programs, producing a condition output indicative of the relationship of said operation information and said interaction indication result, and displaying said condition output on said terminal, and
   (e) a central microprocessor located at a central management facility and including a communication link between said first mentioned microprocessor and said central microprocessor for transmitting the condition outputs.

6. A system as set forth in claim 1 wherein one of said unknown conditions is the cost of electrical power generation and said real-time parameters selected for determining the cost of electrical power are total electrical power use and fuel used and the manual inputs include the cost of fuel and wherein said stored sensed values of said real-time parameters are used to produce historical data including the cost per unit of energy produced and wherein the cost per unit of energy is calculated in real-time and compared to said historical cost per unit of energy and wherein said historical data includes information relating to the total energy produced and wherein said total energy produced in real-time is compared to said total energy historical data to provide an indication of increased energy produced as well as an indication of increase in cost per unit of energy as the total amount of energy produced increases.

7. The system as set forth in claim 1 wherein one of said unknown conditions is engine efficiency and said real-time parameters selected to determine engine efficiency comprise torque, shaft speed, horsepower and fuel used, wherein said real-time shaft speed is maintained constant and said stored sensed values of said real-time parameters are used to generate historical data comprising historical torque values, horsepower values and fuel used values for historical shaft speed values corresponding to said real-time constant shaft speed.

8. The system as set forth in claim 7 wherein said micro-processor compares said real-time fuel used with said historical fuel used to determined excess fuel used due to inefficient engine operation and calculates the cost of said excess fuel used.

9. A system as set forth in claim 1 wherein said powered system is a shipboard power plant and one of said unknown conditions comprises water depth in which said ship is operating, said real-time parameters selected to determine water depth comprise real-time rpm, real-time torque, real-time fuel use and real-time speed and wherein said stored sensed values of said real-time parameters include preceding values of rpm, torque, fuel use and the speed, and said microprocessor is programmed to automatically output an indication of shallow water conditions when said rpm remains constant while said ship speed decreases, said torque increases, and said fuel use increases.

10. A system as set forth in claim 1 wherein one of said unknown conditions is steering system condition and said real-time parameters selected to determined steering system condition comprise real-time speed, real-time rpm, real-time torque, real-time rudder angle, real-time weather, real-time fuel use and real-time heading and said stored sensed values of said real-time parameters include immediately preceding values of speed, rpm, torque, rudder angle, weather, fuel use and heading, and wherein said microprocessor is programmed to automatically compare said current sensed values of said real-time parameters with said preceding values over a predetermined time period with rpm held constant to determine changes in said other parameters thus indicating system defects.

11. A method for real-time management of the operation of a powered system, comprising:
   receiving a plurality of direct inputs for measuring real-time parameters associated with said powered system;
   receiving information related to the operation of said powered system;
   storing sensed values of said real-time parameters and said information; and
   automatically determining a plurality of unknown conditions of said powered system as a function of said sensed values of said real-time inputs and said information by individually selecting said unknown conditions to be determined, selecting the real-time parameters necessary to determine said selected unknown conditions, determining interactions between said selected parameters using stored programs, producing an interaction indication result, relating said interaction indication result to said manually input information using stored programs, producing a condition output indicative of the relationship of said manually input information and said interaction indication result, and displaying said interaction indication result if action related to said powered system should be taken.

12. A method as set forth in claim 11 wherein said determining step comprises commanding that certain of said real-time inputs be held constant to act as comparators in order to sense changes in other of said real-time inputs.

13. A method as set forth in claim 12 wherein said storing step comprises storing historical data in data groups identifiable in accordance with said real-time inputs which are held constant.

14. A method as set forth in claim 12 wherein said powered system is a ship with a power generation plant and one of said unknowns is hull condition of said ship, said parameter selecting step comprising selecting ship speed, shaft horsepower, fuel flow, ship trim, and sea state, and said commanding step comprises commanding the ship speed, trim and sea state to be held constant in real time, and wherein real-time values of horsepower and fuel flow are compared with stored previous horsepower and fuel flow data corresponding to said constant real-time speed, trim and sea state.

15. A method as set forth in claim 14 including the step of calculating excess fuel use due to hull fouling and calculating the cost of said excess fuel use.

16. A method as set forth in claim 11 including transmitting the condition outputs to a central management facility.

17. A method as set forth in claim 12 wherein one of said unknown conditions is the cost of energy in the form of electrical power generation and said parameter selecting step comprises selecting total electrical power used and fuel used, and said stored information comprises the cost of fuel, and wherein the cost of fuel used per unit of energy is calculated based on said real time parameters and stored, the current real-time cost per unit of energy is compared to previously stored cost per unit of energy and wherein the total energy used in real-time is determined and stored and compared to previously stored values of the total energy to provide an indication of increased energy used as well as an indication of increasing cost per unit of energy as the total amount of energy used increases.

18. A method as set forth in claim 12 wherein one of said unknown events is engine efficiency and said real-time parameter selecting step comprises selecting torque, shaft speed, horsepower and fuel used, and wherein said real-time shaft speed is maintained constant and said stored values of said parameters comprise previously sensed torque values, horsepower values and fuel used values for previously sensed shaft speed values corresponding to said real-time constant shaft speed and wherein said previously sensed torque values, horsepower values and fuel used values are compared to real time torque values, horsepower values and fuel used values to determine engine efficiency.

19. A method as set forth in claim 18 comprising comparing said real-time fuel used with said historical fuel used to determine excess fuel used due to inefficient engine operation and calculating the cost of said excess fuel used.

20. A method as set forth in claim 12 wherein said powered system is a ship with a power plant and one of said unknown conditions is the water depth in which said ship is operating, said parameter selecting step comprises selecting rpm, torque, fuel use and ship speed, and wherein said stored values of said parameters comprise preceding values of rpm, torque, fuel use, and ship stepped, and wherein an indication of shallow water condition is determined when said rpm remains constant while said ship speed decreases, said torque increases, and said fuel use increases.

21. A method as set forth in claim 12 wherein one of said unknown conditions is steering system condition and said step of selecting parameters comprises selecting ship speed, rpm, torque, rudder angle, weather, fuel use, and heading, and the stored values of said real-time parameter include preceding values of ship speed, rpm, torque, rudder angle, weather, fuel use, and heading, and therein said sensed values of said real-time parameters and said stored preceding values are compared over a predetermined time period with rpm held constant to determine changes in said other parameters to indicate system defects.

* * * * *